US 9,998,504 B2

(12) United States Patent
Fukushima

(10) Patent No.: US 9,998,504 B2
(45) Date of Patent: Jun. 12, 2018

(54) REMOTE SUPPORT SYSTEM, INFORMATION PROCESSING APPARATUS, IMAGE PROCESSING APPARATUS, METHODS OF CONTROLLING THESE, AND STORAGE MEDIUM

(71) Applicant: CANON KABUSHIKI KAISHA, Tokyo (JP)

(72) Inventor: Kenta Fukushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 15/267,706

(22) Filed: Sep. 16, 2016

(65) Prior Publication Data
US 2017/0093932 A1 Mar. 30, 2017

(30) Foreign Application Priority Data
Sep. 28, 2015 (JP) ................................ 2015-190337

(51) Int. Cl.
*H04M 3/00* (2006.01)
*H04M 5/00* (2006.01)
*H04L 29/06* (2006.01)
*H04L 29/08* (2006.01)
*H04M 3/51* (2006.01)
*H04N 7/18* (2006.01)
(Continued)

(52) U.S. Cl.
CPC .......... *H04L 65/1089* (2013.01); *G06F 9/445* (2013.01); *G06F 9/4445* (2013.01); *G06Q 30/00* (2013.01); *H04L 65/4015* (2013.01); *H04L 67/2809* (2013.01); *H04M 3/5191* (2013.01); *H04N 7/183* (2013.01)

(58) Field of Classification Search
CPC .... H04M 3/5191; H04M 3/51; H04M 3/5183; H04M 3/523
USPC ............ 379/265.09, 265.05, 265.11, 265.01, 379/265.12, 266.01, 242, 247
See application file for complete search history.

(56) References Cited

U.S. PATENT DOCUMENTS

2010/0052892 A1* 3/2010 Allen ....................... A61B 5/01
340/521
2012/0206318 A1 8/2012 Chang et al.
(Continued)

FOREIGN PATENT DOCUMENTS

JP 2013-143137 A 7/2013

OTHER PUBLICATIONS

Mar. 7, 2017 European Search Report in European Patent Appln. No. 16189128.8.

*Primary Examiner* — Thjuan K Addy
(74) *Attorney, Agent, or Firm* — Fitzpatrick, Cella, Harper & Scinto

(57) ABSTRACT

In an information processing apparatus, a mode for transmission to an image processing apparatus that is supported via a relay server is decided, and video is transmitted via the relay server to the image processing apparatus in accordance with a transmission setting corresponding to the decided mode for transmission. Also, if the decided mode for transmission is a mode in which video that captures a portion of a screen displayed on a display unit of the information processing apparatus is transmitted, a frame for deciding a region to be captured is displayed on the display unit of the information processing apparatus, and video internal to the frame is transmitted via the relay server to the image processing apparatus.

17 Claims, 8 Drawing Sheets

(51) Int. Cl.
    *G06F 9/44*           (2018.01)
    *G06F 9/445*         (2018.01)
    *G06Q 30/00*        (2012.01)

(56) References Cited

U.S. PATENT DOCUMENTS

2013/0179825 A1    7/2013   Seo
2015/0085858 A1    3/2015   Kamboh

* cited by examiner

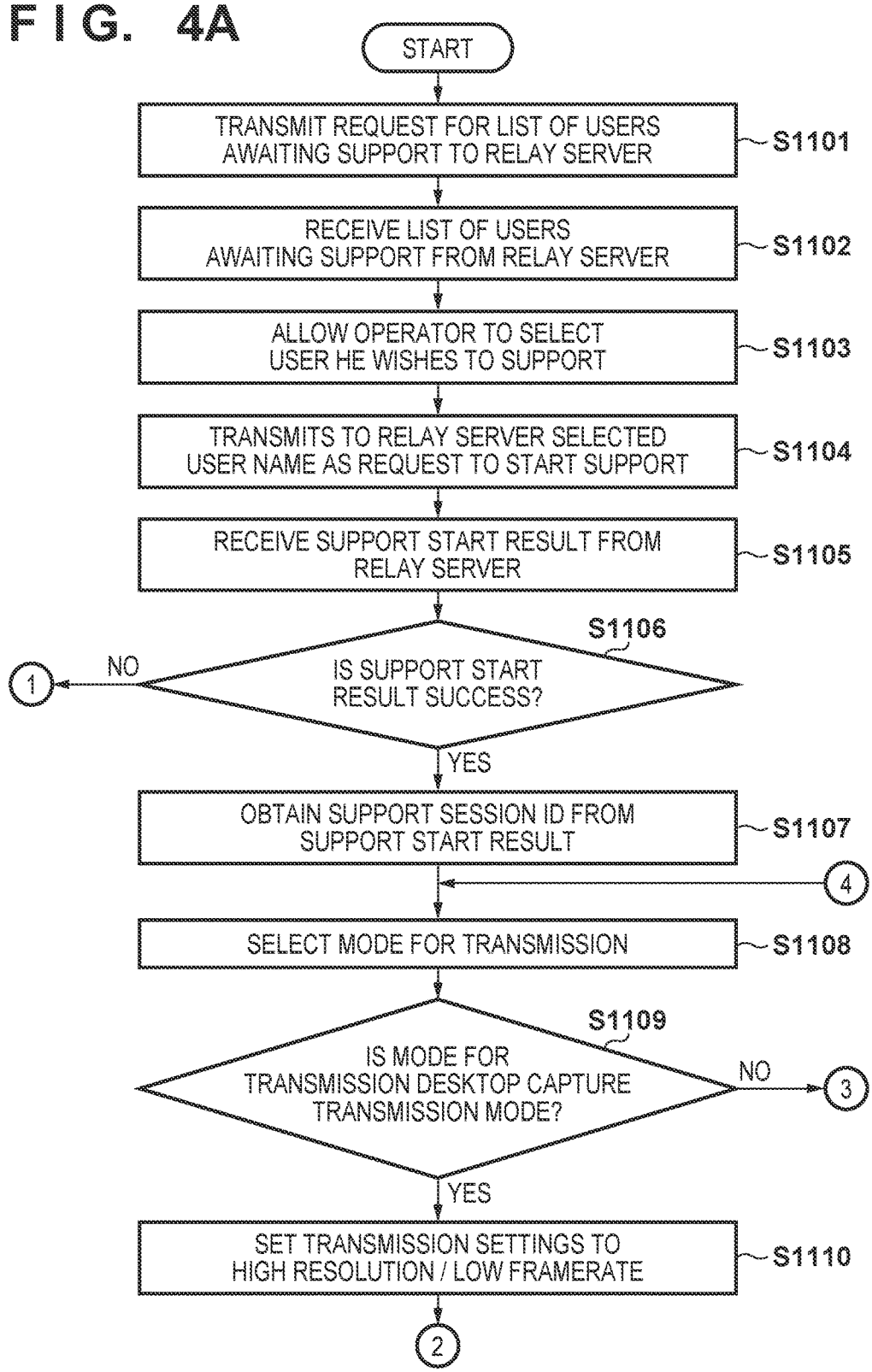

REMOTE SUPPORT SYSTEM, INFORMATION PROCESSING APPARATUS, IMAGE PROCESSING APPARATUS, METHODS OF CONTROLLING THESE, AND STORAGE MEDIUM

BACKGROUND OF THE INVENTION

Field of the Invention

The present invention relates to a remote support system, an information processing apparatus, an image processing apparatus, methods of controlling these, and a storage medium.

Description of the Related Art

As actions for dealing with troubleshooting and usage of products become more complicated, customers frequently directly make questions to a call-center of a manufacturer to get answers. In order to appropriately and quickly deal with troubleshooting, a remote support system including an image processing apparatus and a malfunction management server of the call-center that manages error information of the image processing apparatus is being considered. It is proposed that in the above described remote support system, an operator performs support by remotely operating the image processing apparatus, for which the support is received, from an information processing apparatus of the call-center. In such a remote support system, software of the customer that receives the support can be operated and checked from the information processing apparatus of the call-center. For example, in Japanese Patent Laid-Open No. 2013-143137, a technique is proposed in which, by capturing the PC screen of the customer and transmitting it to a server, the operator swiftly understands a state of trouble.

However, there is a problem as is recited below in the foregoing conventional technique. For example, although it is possible to execute handling of troubleshooting and usage of a product by software screen checking and remote operation in the above described conventional technique, it is not possible to execute operations with respect to hardware. For this reason, in a case of performance of troubleshooting and usage of a product of a scope in which remote operation of a software screen cannot be executed, it is necessary that the operator of the call-center make an oral explanation to the customer and there is a problem in that this is difficult for the customer to understand.

SUMMARY OF THE INVENTION

The present invention enables realization of a mechanism that suitably displays video from an information processing apparatus of a call-center to an image processing apparatus of a customer so as to explain methods of handling trouble and usage of a product to a customer in a more easy to understand manner.

One aspect of the present invention provides a remote support system that includes an image processing apparatus, an information processing apparatus, and a relay server, and in which an operator that uses the information processing apparatus supports, via the relay server, a user that uses the image processing apparatus, the image processing apparatus comprising at least one processor and at least one memory coupled to the at least one processor which act as a first communication unit configured to perform communication with the information processing apparatus via the relay server; and a display control unit configured to cause a display unit of the image processing apparatus to display video in accordance with data received from the information processing apparatus by the first communication unit, and the information processing apparatus comprising at least one processor and at least one memory coupled to the at least one processor which act as a second communication unit configured to perform communication with the image processing apparatus via the relay server; a decision unit configured to decide a mode for transmission to the image processing apparatus that is supported via the relay server; and a transmission control unit configured to transmit video via the relay server to the image processing apparatus by the second communication unit in accordance with a transmission setting corresponding to the mode for transmission decided by the decision unit, wherein the transmission control unit, if the mode for transmission decided by the decision unit is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

Another aspect of the present invention provides a method of controlling a remote support system that includes an image processing apparatus, an information processing apparatus, and a relay server, and in which an operator that uses the information processing apparatus supports, via the relay server, a user that uses the image processing apparatus, wherein in the image processing apparatus, a first communication unit performs communication with the information processing apparatus via the relay server; and a display control unit causes a display unit of the image processing apparatus to display video in accordance with data received from the information processing apparatus by the first communication unit, and in the information processing apparatus, a second communication unit performs communication with the image processing apparatus via the relay server; a decision unit decides a mode for transmission to the image processing apparatus that is supported via the relay server; and a transmission control unit transmits video via the relay server to the image processing apparatus by the second communication unit in accordance with a transmission setting corresponding to the decided mode for transmission, wherein the transmission control unit if the decided mode for transmission is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

Still another aspect of the present invention provides an information processing apparatus that supports an image processing apparatus via a relay server comprising at least one processor and at least one memory coupled to the at least one processor which act as a communication unit configured to perform communication with the image processing apparatus via the relay server; a decision unit configured to decide a mode for transmission to the image processing apparatus that is supported via the relay server; and a transmission control unit configured to transmit video via the relay server to the image processing apparatus by the communication unit in accordance with a transmission setting corresponding to the mode for transmission decided by the decision unit, wherein the transmission control unit, if the mode for transmission decided by the decision unit is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

Yet still another aspect of the present invention provides an image processing apparatus that receives supports from an information processing apparatus via a relay server comprising at least one processor and at least one memory coupled to the at least one processor which act as a communication unit configured to perform communication with the information processing apparatus via the relay server; and a display control unit configured to perform control to display on a display unit of the image processing apparatus video in accordance with data received from the information processing apparatus by the communication unit and a transmission setting of a mode for transmission decided by the information processing apparatus included in the received data, wherein the received data is video internal to a frame for deciding a region to be captured if the mode for transmission decided by the information processing apparatus is a first mode in which video that captures a portion of a screen displayed on a display unit of the information processing apparatus is transmitted.

Still yet another aspect of the present invention provides a method of controlling an information processing apparatus that supports an image processing apparatus via a relay server, the method comprising: a communication unit of the information processing apparatus performing communication with the image processing apparatus via the relay server; a decision unit of the information processing apparatus deciding a mode for transmission to the image processing apparatus that is supported via the relay server; and a transmission control unit of the information processing apparatus transmitting video via the relay server to the image processing apparatus by the communication unit in accordance with a transmission setting corresponding to the decided mode for transmission, wherein the transmission control unit, if the decided mode for transmission is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

Yet still another aspect of the present invention provides a method of controlling an image processing apparatus that receives support from an information processing apparatus via a relay server, the method comprising: a communication unit of the image processing apparatus performing communication with the information processing apparatus via the relay server; and a display control unit of the image processing apparatus causing a display unit of the image processing apparatus to display video in accordance with data received from the information processing apparatus by the communication unit and a transmission setting of a mode for transmission decided by the information processing apparatus included in the received data, wherein the received data is video internal to a frame for deciding a region to be captured if the mode for transmission decided by the information processing apparatus is a first mode in which video that captures a portion of a screen displayed on a display unit of the information processing apparatus is transmitted.

Still yet another aspect of the present invention provides a non-transitory computer-readable storage medium storing a computer program for causing a computer to execute a method of controlling an information processing apparatus that supports an image processing apparatus via a relay server, the method comprising: a communication unit of the information processing apparatus performing communication with the image processing apparatus via the relay server; a decision unit of the information processing apparatus deciding a mode for transmission to the image processing apparatus that is supported via the relay server; and a transmission control unit of the information processing apparatus transmitting video via the relay server to the image processing apparatus by the communication unit in accordance with a transmission setting corresponding to the decided mode for transmission, wherein the transmission control unit if the decided mode for transmission is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

Yet still another aspect of the present invention provides a non-transitory computer-readable storage medium storing a computer program for causing a computer to execute a method of controlling an image processing apparatus that receives support from an information processing apparatus via a relay server, the method comprising: a communication unit of the image processing apparatus performing communication with the information processing apparatus via the relay server; and a display control unit of the image processing apparatus causing a display unit of the image processing apparatus to display video in accordance with data received from the information processing apparatus by the communication unit and a transmission setting of a mode for transmission decided by the information processing apparatus included in the received data, wherein the received data is video internal to a frame for deciding a region to be captured if the mode for transmission decided by the information processing apparatus is a first mode in which video that captures a portion of a screen displayed on a display unit of the information processing apparatus is transmitted.

Further features of the present invention will be apparent from the following description of exemplary embodiments with reference to the attached drawings.

BRIEF DESCRIPTION OF THE DRAWINGS

FIGS. 4A and 4B are flowcharts illustrating processing of an operator PC.

DESCRIPTION OF THE EMBODIMENTS

Figure 1:
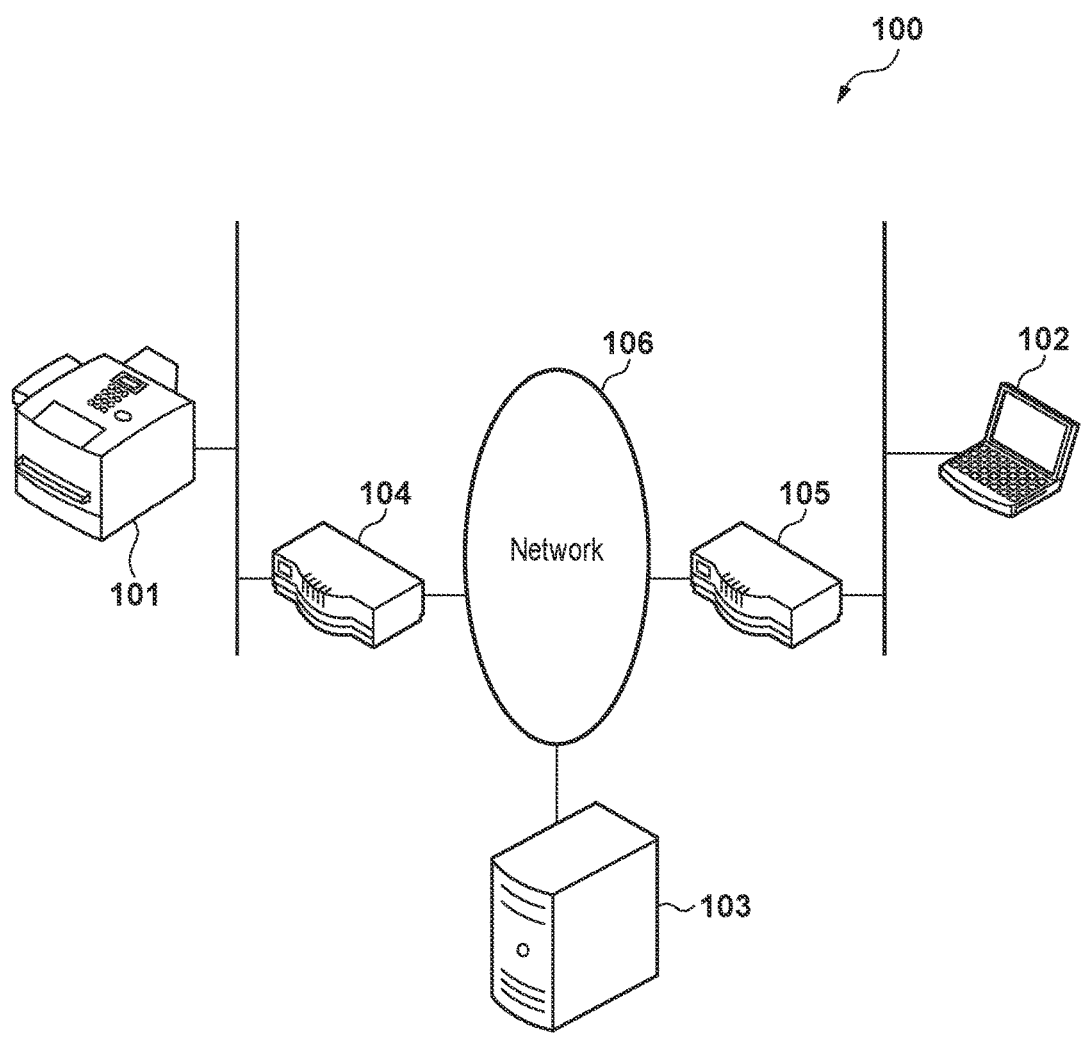
FIG. 1 is a view illustrating a system configuration.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Configuration>

Firstly, a network configuration of a remote support system 100 according to embodiments of the present invention will be described with reference to FIG. 1. The remote support system 100 is equipped with an image processing apparatus 101, an operator PC 102, an HTTP relay server 103, and firewalls 104 and 105. These components are connected to be able to intercommunicate via a network 106.

The image processing apparatus 101 and the operator PC 102 operate as mutual communication partners as apparatuses to which the present invention is applied. The image processing apparatus 101 and the operator PC 102 are equipped with a data communication function which executes call control by HTTP (HyperText Transfer Protocol) to perform data communication.

Regarding FIG. 1, the image processing apparatus 101 is connected to the network 106 through the firewall (FW) 104. Also, the operator PC 102 of the call-center side is connected to the network 106 through the firewall 105. In addition, the HTTP relay server 103 is connected to the network 106. Hereinafter, the HTTP relay server 103 will be abbreviated as simply the relay server 103.

In data communication by HTTP, client nodes can execute data communication with each other by performing POST and GET for a URI (Uniform Resource Identifier) which is provided from the relay server 103. With this, it is possible for client nodes to perform data communication with each other even when blocked by a private address area and a firewall. In the present embodiment, the image processing apparatus 101 and the operator PC 102 operate as HTTP client nodes. Also, in the present embodiment, although between the client nodes is a configuration for communicating to the network 106 via the firewalls, it may be a network configuration that does not go through a firewall. Also, more firewalls, image processing apparatuses, and operator PCs may be connected on the network 106 than are shown in the figure. Also, in the present embodiment, HTTP does not need to be used as the communication protocol.

<Hardware Configuration>

Figure 2:
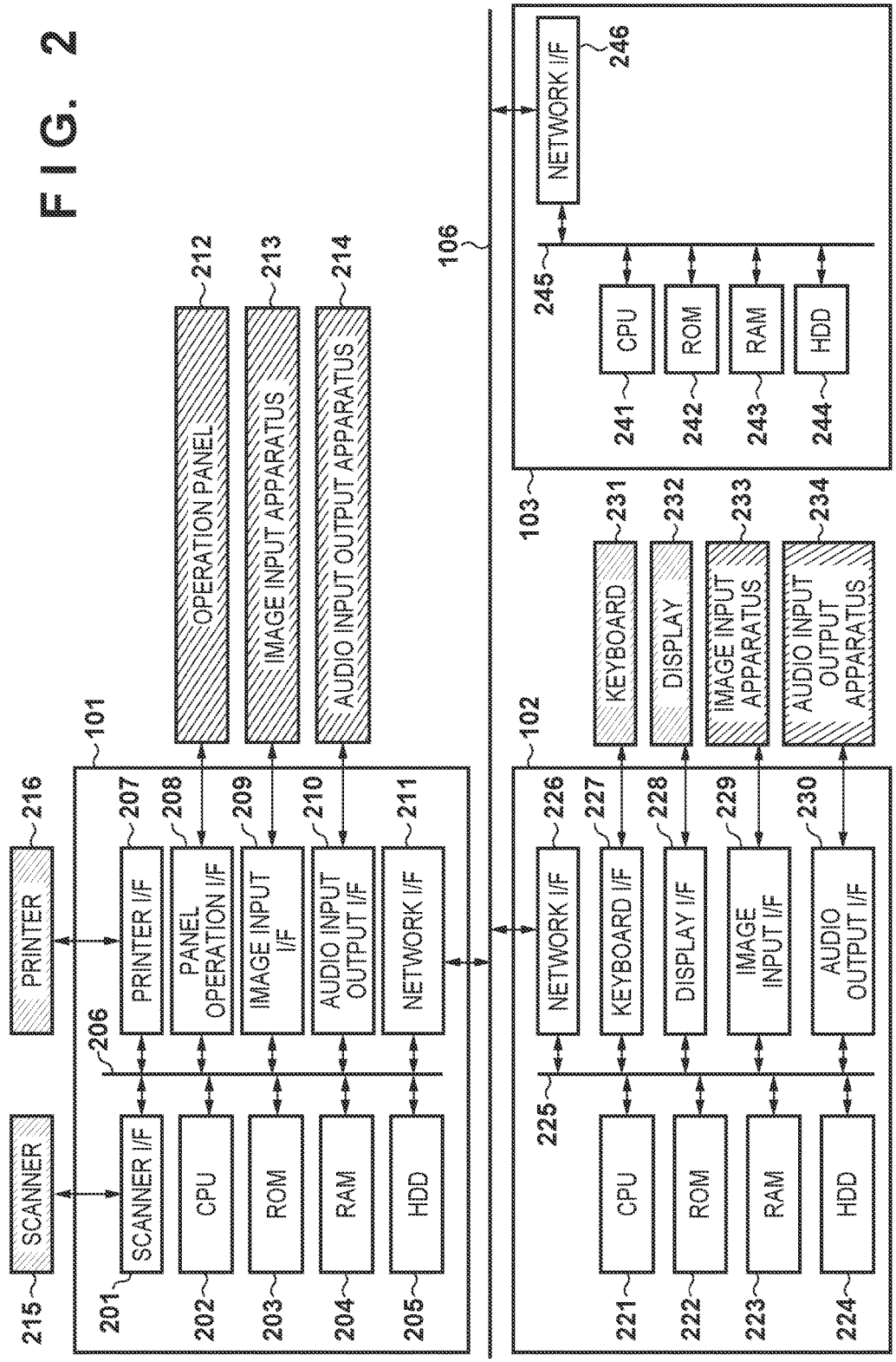
FIG. 2 is a view illustrating a hardware configuration of a remote support system.

Next, a hardware configuration of the remote support system 100 according to embodiments of the present invention will be described with reference to FIG. 2. The image processing apparatus 101 is equipped with a scanner I/F 201, a CPU 202, a ROM 203, a RAM 204, an HDD 205, a printer I/F 207, a panel operation I/F 208, an image input I/F 209, an audio input output I/F 210, and a network I/F 211.

The CPU 202 comprehensively controls an access with various devices connected to a system bus 206 based on control programs stored in the ROM 203 or the hard disk (HDD) 205. The ROM 203 stores control programs and the like that the CPU 202 can execute. The RAM 204 mainly functions as a main memory of the CPU 202, a work area, or the like, and is configured such that the memory capacity can be expanded by option RAM connected to an expansion port. The hard disk (HDD) 205 stores a boot program, various applications, font data, user files, edit files, and the like. Note that in the present embodiment, although the HDD 205 is used, an SD card, flash memory, or the like other than the HDD 205 may be used as an external storage apparatus.

The scanner I/F 201 controls input of an image from a scanner 215. The printer I/F 207 controls output of an image to a printer 216. The panel operation I/F 208 controls a display control of an operation panel 212 and input of various setting information set by the operation panel 212. The image input I/F 209 controls input of images from an image input apparatus 213 such as a camera or the like. The audio input output I/F 210 controls input and output of audio with an audio input output apparatus 214 such as a headset or the like. The network I/F 211 performs data communication with an external network through a network cable.

The operator PC 102 is equipped with a CPU 221, a ROM 222, a RAM 223, an HDD 224, a network I/F 226, a keyboard I/F 227, a display I/F 228, an image input I/F 229, and an audio input output I/F 230. The CPU 221 comprehensively controls access with the various devices connected to a system bus 225 based on control programs stored in the ROM 222 or the hard disk (HDD) 224. The ROM 222 stores control programs and the like that the CPU 221 can execute. The RAM 223 mainly functions as a main memory of the CPU 221, a work area, or the like, and is configured such that the memory capacity can be expanded by option RAM connected to an expansion port. The hard disk (HDD) 224 stores a boot program, various applications, font data, user files, edit files, and the like. Note that in the present embodiment, although the HDD 224 is used, an SD card, flash memory, or the like other than the HDD 224 may be used as an external storage apparatus. Each component is connected to be able to perform signal communication by the system bus 225.

The network I/F 226 performs data communication with an external network through a network cable. The keyboard I/F 227 controls key inputs from a keyboard 231 or a pointing device. The display I/F 228 controls display of a display 232 which is a display unit. The image input I/F 229 controls input of images from an image input apparatus 233 such as a camera or the like. The audio input output I/F 230 controls input and output of audio with an audio input output apparatus 234 such as a headset or the like.

The HTTP relay server 103 is equipped with a CPU 241, a ROM 242, a RAM 243, an HDD 244, and a network I/F 246. The CPU 241 comprehensively controls access with the various devices connected to a system bus 245 based on control programs stored in the ROM 242 or the hard disk (HDD) 244. The ROM 242 stores control programs and the like that the CPU 241 can execute. The RAM 243 mainly functions as a main memory of the CPU 241, a work area, or the like, and is configured such that the memory capacity can be expanded by option RAM connected to an expansion port. The hard disk (HDD) 244 stores a boot program, various applications, font data, user files, edit files, and the like. Note that in the present embodiment, although the HDD 244 is used, an SD card, flash memory, or the like other than the HDD 244 may be used as an external storage apparatus. Each component is connected to be able to perform signal communication by the system bus 245. The network I/F 246 performs data communication with an external network through a network cable.

<Operational Flow>

Next, an operational flow of the system of the present embodiment will be described with reference to FIG. 3 through FIG. 6. Firstly, the image processing apparatus 101 accesses the relay server 103 and enters a state in which it awaits reception of video data. Following this, the operator PC 102 accesses the relay server 103 and starts a transmission of the video data. By this, the image processing apparatus 101 receives the video data and becomes capable of displaying the video on the operation panel 212. Next, description in more detail of processing of the image processing apparatus 101, the operator PC 102, and the relay server 103 will be given.

Figure 3:
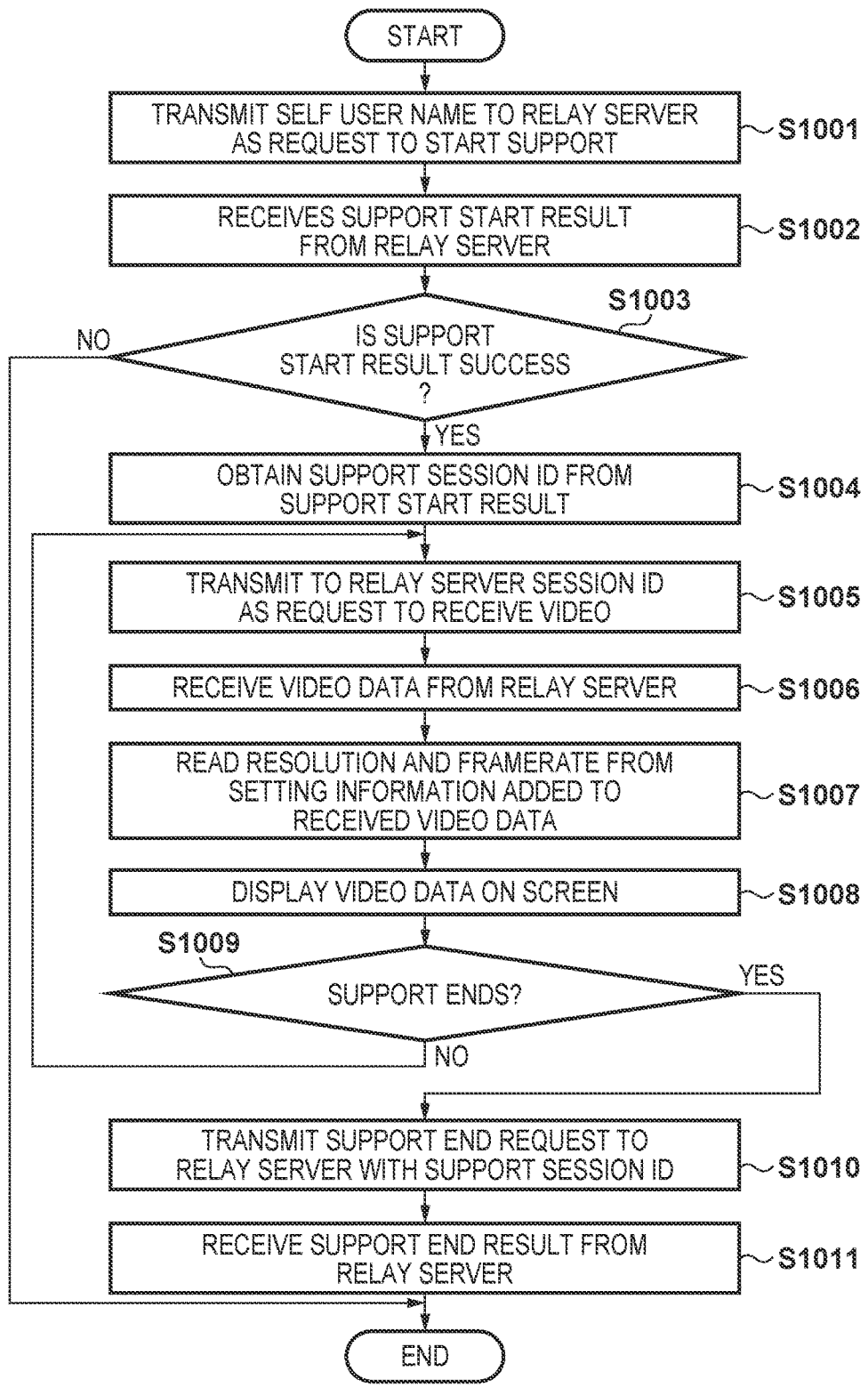
FIG. 3 is a flowchart illustrating processing of an image processing apparatus.

Firstly, description will be given regarding a process flow of the present embodiment in the image processing apparatus 101 with reference to FIG. 3. This flowchart is implemented by a program stored in the HDD 205 being read into the RAM 204 and executed by the CPU 202. Note, the CPU 221 in the processing described hereinafter functions as a first communication unit and a display unit.

In step S1001, the CPU 202 of the image processing apparatus 101 first transmits a request to start support to the relay server 103 when the present embodiment is started. Here, a self user name is included in the transmission data for identifying the image processing apparatus 101. This self user name may be stored in advance in the HDD 205 of the image processing apparatus 101, and a user may input it at a time of the start of the present embodiment.

In step S1002, when the CPU 202 completes transmission of the request to start support, it receives a support start result (response) from the relay server 103. Following this, in step S1003, the CPU 202 determines whether or not the support start result received in step S1002 is success. If the support start result is a failure, the processing ends.

Meanwhile, if the support start result is success, the processing proceeds to step S1004, and the CPU 202 obtains a support session ID (identifier) from the received data. The support session ID is a unique identifier that the relay server 103 issues for executing the support. A process flow of the relay server 103 regarding a method of managing the support session ID will be described in detail later. When the support session ID is obtained the processing proceeds to step S1005 and the CPU 202 transmits a request to receive video to the relay server 103. At this time, the CPU 202 includes the support session ID obtained in step S1004 in the transmission data.

When transmission of the request to receive the video completes, the processing proceeds to step S1006 and the CPU 202 receives the video data from the relay server 103. The reception processing of step S1006 starts when the operator PC 102 instructs transmission of the video data, so in a case where the operator PC 102 has not instructed transmission yet, the processing continues to be awaited. The operator PC 102 instructs a start of transmission of the video data, and when the reception processing of step S1006 is performed, the CPU 202 in step S1007 obtains a resolution and a framerate of the video from setting information (transmission setting) added to the received video data.

Next, the CPU 202 in step S1008 performs display processing on the operation panel 212 in accordance with the resolution and the framerate of the received video data obtained in step S1007. With this, the user of the image processing apparatus 101 can check the video that an operator tried to display, and explanation of the usage method and the troubleshooting method of the product becomes easier to understand. When the processing to display the video of a fixed time period finishes in step S1009, the CPU 202 determines whether or not the support ends. This determination may be determined from the received data, and may be determined from an input to the operation panel 212 of the image processing apparatus 101. If it is determined that it has not ended, the processing returns to step S1005, and video data is further received.

Meanwhile, if it is determined that it has ended, the processing proceeds to step S1010, and the CPU 202 transmits a support end request to the relay server 103. At this time, the CPU 202 includes the support session ID obtained in step S1004 in the transmission data. When transmission of the support end request completes, the processing proceeds to step S1011, and the CPU 202 receives a support end result (response) from the relay server 103 and ends the present embodiment.

Figure 4B:
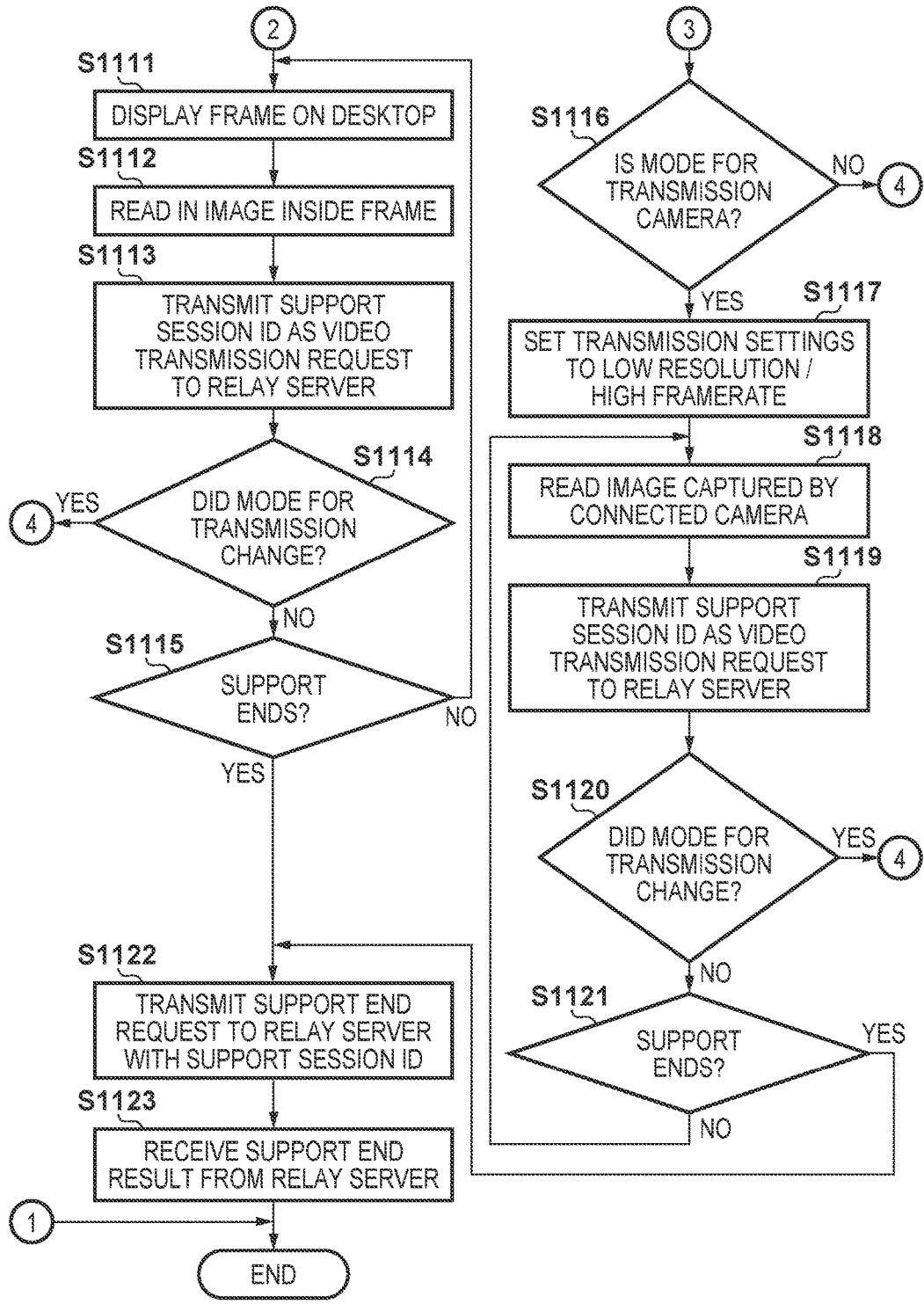

Next, description will be given regarding a process flow of the present embodiment in the operator PC 102 with reference to FIGS. 4A and 4B. This flowchart is implemented by a program stored in the HDD 224 being read into the RAM 223 and executed by the CPU 221. Note, the CPU 221 in the processing described hereinafter functions as a second communication unit and a decision unit, a switching unit, and a transmission control unit.

In step S1101, the CPU 221 of the operator PC 102 first transmits a request for a list of users awaiting support to the relay server 103 when the present embodiment is started. When transmission of the request for a list of users awaiting support completes, the processing proceeds to step S1102, and the CPU 221 receives a list of users awaiting support from the relay server 103 and displays this on the display 232. The user name that the image processing apparatus 101 transmitted in step S1001 of FIG. 3 is displayed in this list.

Next, the CPU 221 in step S1103 accepts input of a selection of a support target user from the operator. When a selection is accepted, in step S1104 the CPU 221 transmits the request to start support to the relay server 103. At this time, the selected user name which is selected in step S1103 is included in the transmission data. By the selected user name, the relay server 103 can determine what clients are to be connected. This processing of the relay server 103 will be described within the flowchart of the relay server 103 described later.

When transmission of the support start request completes, in step S1105, the CPU 221 receives a support start result (response) from the relay server 103. Following this, in step S1106, the CPU 221 determines whether or not the support start result received in step S1105 is success. If the support start result is a failure, the processing ends. Meanwhile, if the support start result is success, the processing proceeds to step S1107, and the CPU 221 obtains a support session ID from the received data. The support session ID is an identifier that the relay server 103 issues for executing the support. A detailed method of managing the support session ID will be described in the process flow of the relay server 103 later.

When the support session ID is obtained, the processing proceeds to step S1108, and the CPU 221 accepts a selection of a mode for transmission of the video data from the operator. For example, there is a "desktop capture transmission mode", a "connected camera video transmission mode" and the like for the transmission mode. The "desktop capture transmission mode" is a mode in which images of a PC desktop are captured and transmitted as a moving image. The "connected camera video transmission mode" is a mode in which a video input from a camera embedded in a PC, connected by USB, or the like is transmitted as a moving image.

When input acceptance completes, in step S1109 the CPU 221 determines whether or not the selected mode for transmission is the "the desktop capture transmission mode". If in the determination of step S1109 the "desktop capture transmission mode" is determined, the processing proceeds to step S1110, and the CPU 221 sets the transmission settings for the video to be transmitted to a high resolution and a low framerate.

Next, the CPU 221 in step S1111 displays a frame in a portion of the display screen on the desktop for deciding a region to be captured. The position of this frame can be moved by the user dragging it by a mouse operation in relation to the operator PC 102. By displaying this frame, the operator can know the range on the desktop screen of the operator PC 102 displayed on the image processing apparatus 101. Following this, the CPU 221 in step S1112 obtains the desktop display screen internal to the frame displayed in step S1111 and converts it into a moving image (video).

When obtainment completes, in step S1113 the CPU 221 transmits the video transmission request to the relay server 103. At this time, the support session ID obtained in step S1107 and the data obtained in step S1112 are included in the transmission data. In addition, the data obtained in step S1112 is processed into video data in accordance with the settings decided in step S1110.

The "desktop capture transmission mode" displays an electronic instruction manual or the like stored in the operator PC 102 and uses it in a case in which the operator will explain a usage method or a troubleshooting method to the user of the image processing apparatus 101. For manuals, character information is often included in addition to illustrations and photographs and so a high resolution is required, but on the other hand there are few cases where the manual is moved while it is being displayed; it is only envisioned that it would move at about the rate at which the mouse pointer moves, and so a high framerate is not required. For this reason, the high resolution and low framerate are set in step S1110.

When the processing for transmitting data of a fixed time period finishes in step S1114, the CPU 221 determines whether or not the mode for transmission of the video data changed. In this determination, it is determined whether or not a request for switching the mode for transmission of the video data was inputted to the operator PC 102. If it is determined that there was a switching of the mode for transmission of the video data in step S1114, the processing returns to step S1108.

Meanwhile, if it is determined that there was no switching of the mode for transmission of the video data in step S1114, the CPU 221 in step S1115 determines whether or not the support ends. This determination may be determined from the received data, and may be determined from an input to the operator PC 102. If it is determined that it has not ended, the processing returns to step S1111, and video data continues to be transmitted. If it is determined to be end, the processing proceeds to step S1122.

If in the determination of step S1109 the "desktop capture transmission mode" is not determined, the processing proceeds to step S1116, and the CPU 221 determines whether or not the selected mode for transmission is the "connected camera video transmission mode". If it is determined that the determination of step S1116 is not the "connected camera video transmission mode", the processing returns to step S1108, and once again selection of the mode for transmission is accepted. Meanwhile, if in the determination of step S1116 the "connected camera video transmission mode" is determined, the CPU 221, in step S1117, sets the transmission settings for the video to be transmitted to a low resolution and a high framerate.

Next, the CPU 221 in step S1118 obtains an image captured by the connected camera. When obtainment completes, in step S1119 the CPU 221 transmits the video transmission request to the relay server 103. At this time, the support session ID obtained in step S1107 and the data obtained in step S1118 are included in the transmission data. In addition, the data obtained in step S1118 is processed into video data in accordance with the settings decided in step S1117. The "connected camera video transmission mode" is used to show the face of the operator to the user of the image processing apparatus 101. Although a high framerate is required because it is necessary for video of a camera to display detailed behavior such as a change in facial expression, but a high resolution is not required because there is not much information such as detailed characters. For this reason, the low resolution and high framerate are set in step S1117.

When the processing for transmitting data of a fixed time period finishes, in step S1120 the CPU 221 determines whether or not the mode for transmission of the video data changed. In this determination, it is determined whether or not a request for switching the mode for transmission of the video data was inputted to the operator PC 102. If it is determined that there was a switching of the mode for transmission of the video data in step S1120, the processing returns to step S1108. Meanwhile, if it is determined that there was no switching of the mode for transmission of the video data in step S1120, the CPU 221 in step S1121 determines whether or not the support ends. This determination may be determined from the received data and may be determined from an input to the operator PC 102. If it is determined that it has not ended, the processing returns to step S1118, and video data continues to be transmitted. If it is determined to be end, the processing proceeds to step S1122.

Although the resolution and the framerate in the differing transmission modes in the present embodiment as described in step S1108 to in step S1121 change, transmission by the same "video transmission request" is performed. For this reason, the image processing apparatus 101 can display the video data rather than performing a switch even if the transmission modes differ according to step S1008 of FIG. 3. For a UI of the image processing apparatus 101, opening a plurality of windows and performing an operation of using these while switching between them smoothly is difficult, and so being able to perform a display without switching has the merit that an operation that is complicated for the user becomes unnecessary. Note, these switches are possible because transmission and reception and display are performed in accordance with the transmission settings (resolution and framerate) for each mode for transmission.

If it is determined that it has ended in step S1115 or step S1121, the CPU 221 in step S1122 transmits a support end request to the relay server 103. At this time, the CPU 221 includes the support session ID obtained in step S1107 in the transmission data. When transmission of the support end request completes, the CPU 221 in step S1123 receives a support end result (response) from the relay server 103 and ends this processing flow.

Next, description will be given regarding a process flow of the present embodiment in the relay server 103 with reference to FIGS. 5A and 5B. This flowchart is implemented by a program stored in the HDD 244 being read into the RAM 243 and executed by the CPU 241.

In step S1201, the CPU 241 of the relay server 103 firstly receives data from the client. Here, this client is the image processing apparatus 101 or the operator PC 102. When the data is received in each determination process of step S1202, step S1205, step S1214, step S1220, and step S1226, the CPU 241 determines what kind of request the received data is. If a request cannot be determined, the processing returns to step S1201, and subsequent data is received.

Figure 6:
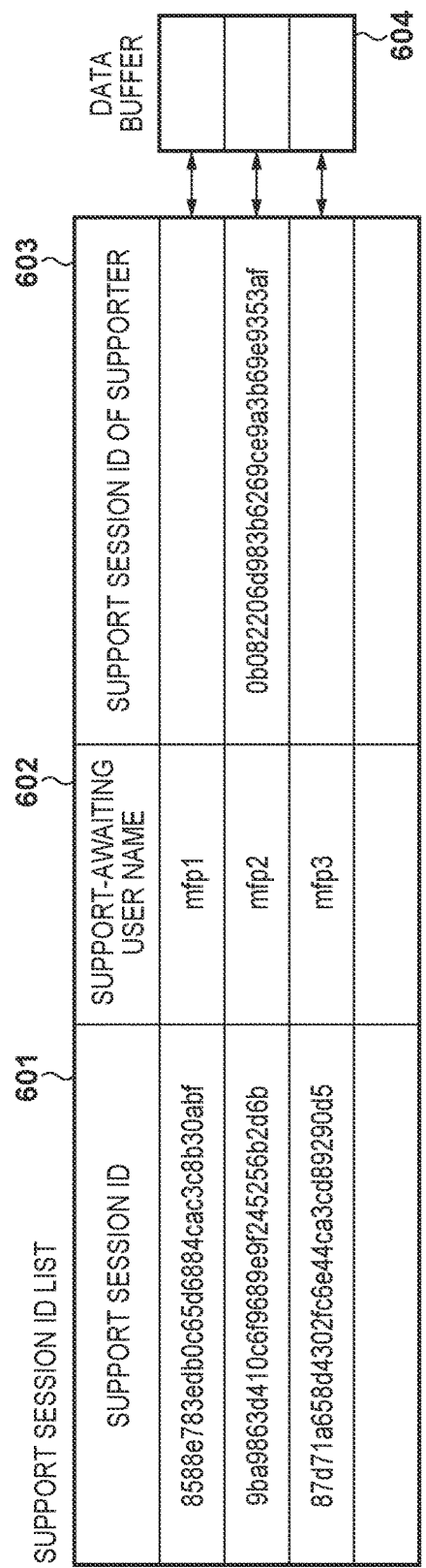
FIG. 6 is a view illustrating an example of a management method for a support session ID in the relay server.

If the data received in step S1201 is the request for a list of users awaiting support (Yes in step S1202), the processing proceeds to step S1203, and the CPU 241 obtains user names for which the support has not yet been performed from the support session ID list. Here, an example of the support session ID list is illustrated in FIG. 6. Firstly, a "support session ID" column of reference numeral 601 is support session IDs generated for the image processing apparatus 101. A "support-awaiting user name" column of reference numeral 602 is a user name that the image processing apparatus 101 transmitted in the request to start support. Firstly, a "support session ID of supporter" column of reference numeral 603 is the session IDs generated for the operator PC 102. As illustrated in FIG. 6, in a case in which the user of the image processing apparatus 101 and the user selected by the operator PC 102 are the same, the support session ID corresponding to the user of the operator PC 102 and the support session ID corresponding to the operator PC 102 are associated and registered.

A "support session ID of supporter" being filled in indicates that a communication of the video data between the operator PC 102 and the image processing apparatus 101 corresponding to the row has started. Also, a "data buffer" of reference numeral 604 is a buffer used for communication of the video data corresponding to the row. Explanation for a timing for storing data and processing content for each item is given individually in the items of the flowchart illustrated in FIGS. 5A and 5B. User names not yet supported in step S1203 are user names corresponding to "mfp1" and "mfp3" as illustrated in FIG. 6.

Figure 5A:
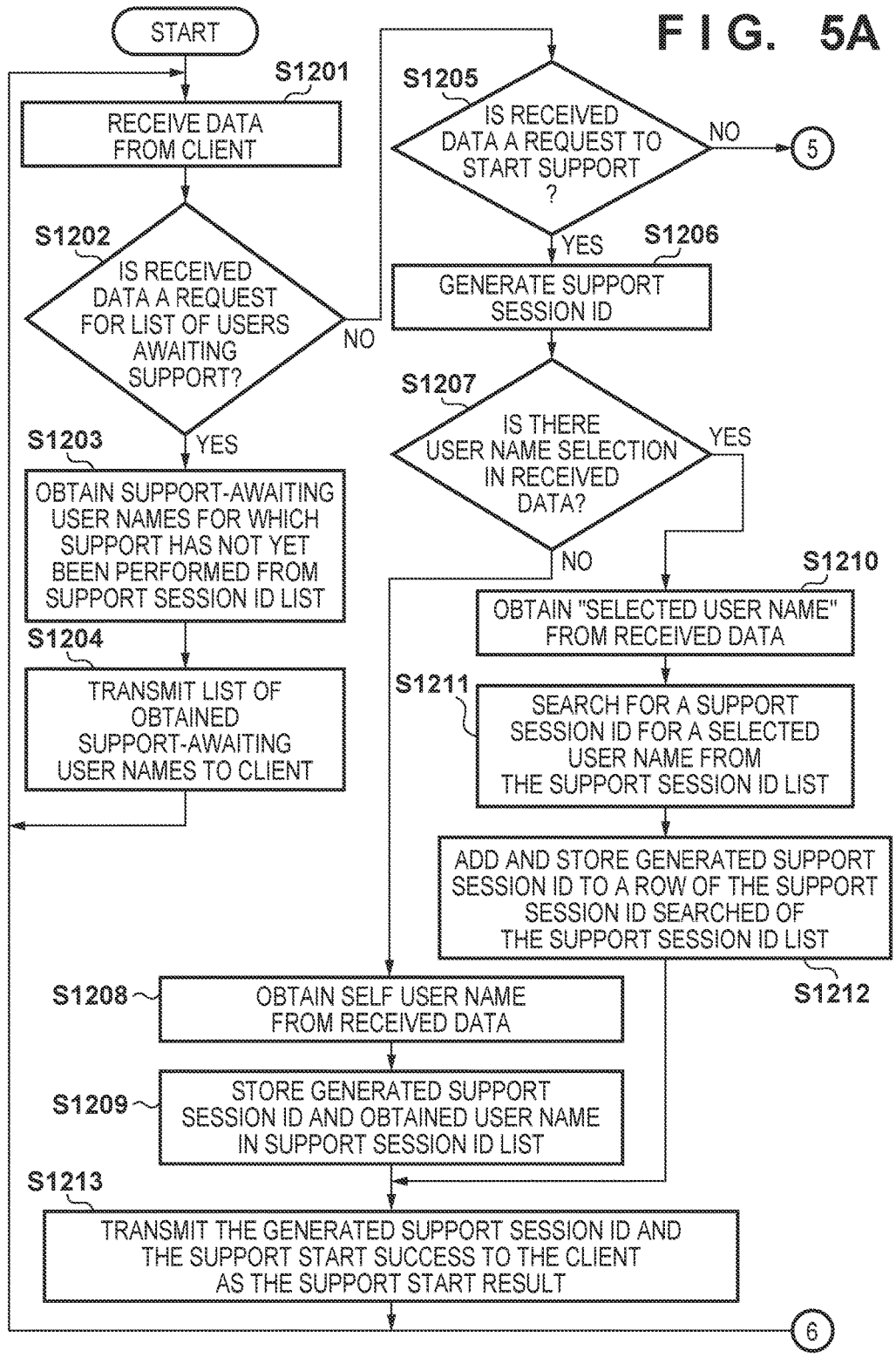
FIGS. 5A and 5B are flowcharts illustrating processing of a relay server.
Figure 5B:
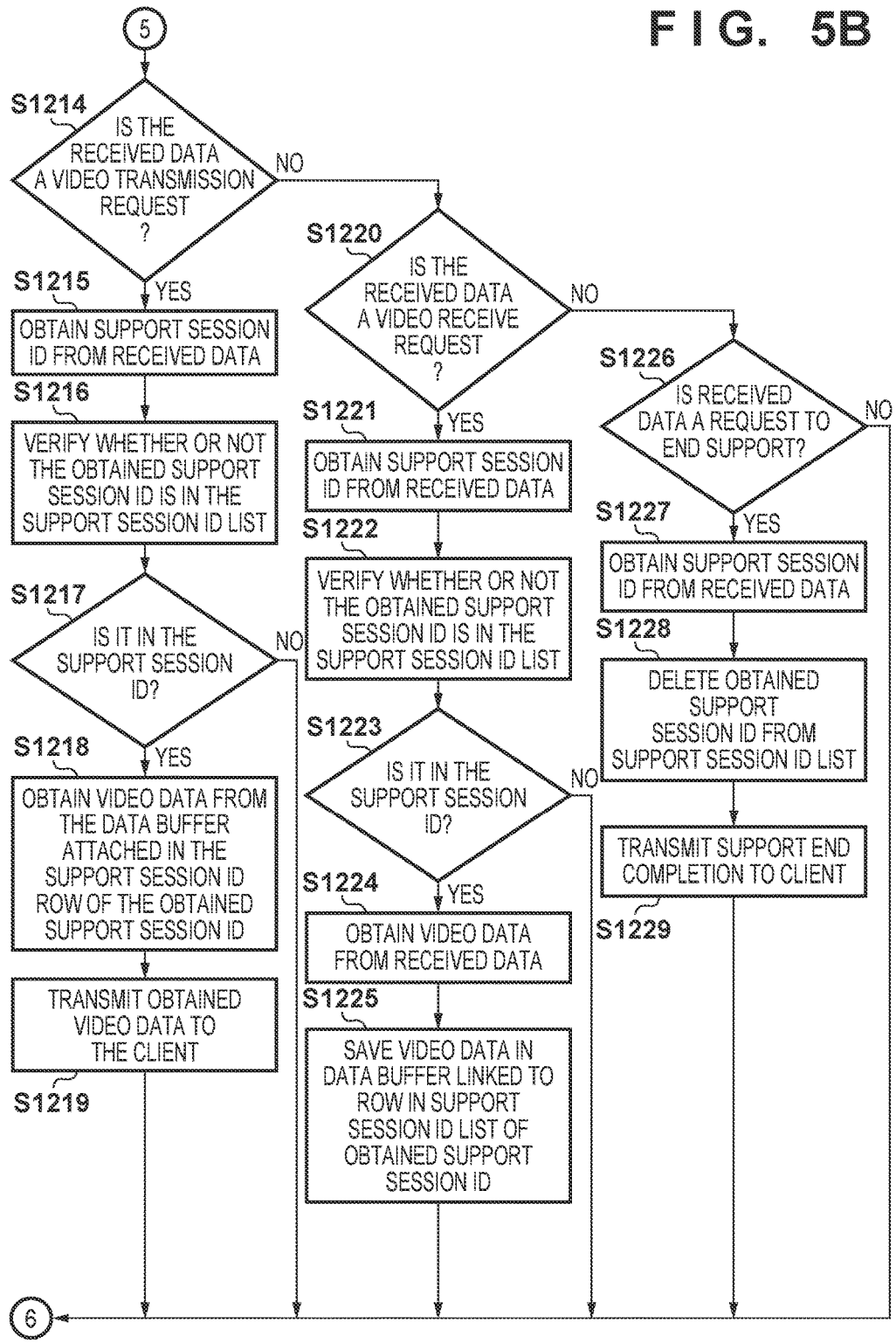

The explanation of FIGS. 5A and 5B is returned to. In step S1204, the CPU 241 notifies a list of user names obtained in step S1203 to the client. The client in step S1204 is specifically the operator PC 102. When transmission processing of step S1204 completes, the processing returns to step S1201.

If the data received in step S1201 is the request to start support (Yes in step S1205), the processing proceeds to step S1206, and the CPU 241 generates a support session ID. Following this, the CPU 241 in step S1207 determines whether or not there is a "selected user name" in the data received in step S1201. Specifically, in a case when there is a selected user name, this means that the request is from the operator PC 102, and in a case when there is not, this means that the request is from the image processing apparatus 101.

In a case when in step S1207 there is no selected user name (if the request is from the image processing apparatus 101) the processing proceeds to step S1208, and the CPU 241 obtains a "self user name" from the data received in step S1201. The CPU 241 in step S1209 stores the support session ID generated in step S1206 to the "support session ID" column 601 of a blank row of the support session ID list, and stores the "self user name" obtained in step S1208 to the "support-awaiting user name" column 602.

Meanwhile, in a case when in step S1207 there is a selected user name (if the request is from the operator PC 102), in step S1210 the CPU 241 obtains the "selected user name" from the data received in step S1201. Following this, the CPU 241 in step S1211 searches for a user name matched in the "selected user name" obtained in step S1210 from the "support-awaiting user name" column 602 of the support session ID list. When the search completes in step S1212, the CPU 241 stores the support session ID generated in step S1206 to the "support session ID of supporter" column 603 of the row searched for in step S1211 of the support session ID list.

When step S1209 and step S1212 complete in step S1213, the CPU 241 transmits the support session ID generated in step S1206 to the client as a support start result (response). The client in the processing of step S1213 may be both cases of the image processing apparatus 101 and the operator PC 102. When step S1213 completes, the processing returns to step S1201.

If the data received in step S1201 is a video transmission request (Yes in step S1214), the processing proceeds to step S1215, and the CPU 241 obtains the support session ID from the data received in step S1201. When obtainment of the support session ID completes, in step S1216 the CPU 241 verifies whether the support session ID obtained in the "support session ID" column 601 of the support session ID list exists. When the verification completes, in step S1217 the CPU 241 determines the verification result of step S1216. If it is determined that it does not exist in step S1217 then the processing returns to step S1201.

On the other hand, if it is determined that it does exist in step S1217, the CPU 241 in step S1218 obtains data from a data buffer corresponding to the row of the support session ID list in which the support session ID obtained in step S1215 exists. When the data obtainment completes, in step S1219 the CPU 241 transmits (transfers) the data obtained in step S1218 to the client. The client in step S1219 is specifically the image processing apparatus 101. When step S1219 completes, the processing returns to step S1201. Here, the transferred data is data stored in the data buffer in step S1225 described later.

In a case where the data received in step S1201 is the request to receive video (Yes in step S1220), the processing proceeds to step S1221 and the CPU 241 obtains the support session ID from the data received in step S1201. When obtainment of the support session ID completes, in step S1222 the CPU 241 verifies whether the support session ID obtained in the "support session ID of supporter" column 603 of the support session ID list exists. When the verification completes, in step S1223 the CPU 241 determines the verification result of step S1222. If it is determined that it does not exist in step S1223 then the processing returns to step S1201. In step S1224, if it is determined that it exists in step S1223, the CPU 241 obtains the video data from the data received in step S1201. When the video data is obtained, in step S1225 the CPU 241 stores the video data to a data buffer corresponding to the row of the support session ID list in which the support session ID obtained in step S1221 exists. The client to which this video data is transmitted is specifically the operator PC 102. When step S1225 completes, the processing returns to step S1201.

If the data received in step S1201 is a support end request (Yes in step S1226), the processing proceeds to step S1227, and the CPU 241 obtains the support session ID from the data received in step S1201. When obtainment of the support session ID completes, in step S1228 the CPU 241 deletes the support session ID obtained from the support session ID list. When deletion completes in step S1229, the CPU 241 transmits support end completion to the client. The client in the processing of step S1229 may be either the image processing apparatus 101 or the operator PC 102. When step S1229 completes, the processing returns to step S1201.

As explained above, in the remote support system 100 according to embodiments, an operator supports the image processing apparatus 101 remotely via the operator PC 102. Specifically, a frame on the screen on the operator PC 102 that the operator uses is displayed, and support that is easily-to-understand for the user is realized by transmitting the images within the frame as video to the image processing apparatus 101 and causing it to be displayed. Note, the plurality of modes, as modes for transmission, can include a mode in which images within the above described frame are captured and a mode that transmits camera images and the like as video, and the resolution and framerate in each mode can be suitably changed, to provide a user friendly system for operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-190337 filed on Sep. 28, 2015, which is hereby incorporated by reference herein in its entirety.

What is claimed is:

1. A remote support system that includes an image processing apparatus, an information processing apparatus, and a relay server, and in which an operator that uses the information processing apparatus supports, via the relay server, a user that uses the image processing apparatus,
the image processing apparatus comprising at least one processor and at least one memory coupled to the at least one processor which act as
a first communication unit configured to perform communication with the information processing apparatus via the relay server; and
a display control unit configured to cause a display unit of the image processing apparatus to display video in accordance with data received from the information processing apparatus by the first communication unit, and
the information processing apparatus comprising at least one processor and at least one memory coupled to the at least one processor which act as
a second communication unit configured to perform communication with the image processing apparatus via the relay server;
a decision unit configured to decide a mode for transmission to the image processing apparatus that is supported via the relay server; and
a transmission control unit configured to transmit video via the relay server to the image processing apparatus by the second communication unit in accordance with a transmission setting corresponding to the mode for transmission decided by the decision unit,
wherein the transmission control unit,
if the mode for transmission decided by the decision unit is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

2. The remote support system according to claim 1, wherein the transmission control unit,
if the mode for transmission decided by the decision unit is a second mode in which video of a camera that is arranged on the information processing apparatus is transmitted, transmits to the image processing apparatus via the relay server video captured from the camera.

3. The remote support system according to claim 2, wherein
the at least one processor and the at least one memory of the information processing apparatus further act as
a switching unit configured to switch the mode for transmission when video is transmitted by the transmission control unit.

4. The remote support system according to claim 2, wherein
the transmission control unit,
if the mode for transmission is the first mode, transmits video with, as transmission settings, higher resolution and lower framerate than in the second mode, and,
if the mode for transmission is the second mode, transmits video with, as transmission settings, lower resolution and higher framerate than in the first mode.

5. The remote support system according to claim 4, wherein
the at least one processor and the at least one memory of the information processing apparatus further act as
a conversion unit configured to convert images internal to the frame into a moving image in accordance with the resolution and the framerate of the transmission settings of the first mode.

6. The remote support system according to claim 4, wherein the display control unit causes video to display on the display unit in accordance with the resolution and the framerate included in the data received from the information processing apparatus.

7. The remote support system according to claim 1, wherein
the first communication unit comprises:
a unit configured to transmit a request to start support to the relay server;
a unit configured to receive a response of the request to start support from the relay server;
a unit configured to obtain an identifier for the image processing apparatus included in the response of the request to start support;
a unit configured to transmit a request to receive video to the relay server using the obtained identifier; and
a unit configured to receive data from the information processing apparatus as a response of the request to receive from the relay server.

8. The remote support system according to claim 7, wherein
the second communication unit comprises:
a unit configured to obtain a list of users awaiting support from the relay server;

a unit configured to transmit to the relay server a request to start support of a user selected in accordance with an input of the operator from the obtained list;
a unit configured to receive a response of the request to start support,
a unit configured to obtain an identifier for the information processing apparatus included in the response of the request to start support;
wherein the transmission control unit,
by transmitting to the relay server video together with the obtained identifier and the selected user, transmits the video to the image processing apparatus, which is a support target.

9. The remote support system according to claim 8, wherein
the relay server comprises at least one processor and at least one memory coupled to the at least one processor which act as
a generation unit configured to generate, in a case where a request to start support is received from the image processing apparatus, a unique identifier for a user of the image processing apparatus, and to generate, in a case where a request to start support to the selected user is received from the information processing apparatus, a unique identifier for the information processing apparatus; and
a registration unit configured to, if the user of the image processing apparatus and the user selected in the information processing apparatus are the same, register the identifier for the user of the image processing apparatus and the identifier for the information processing apparatus in association in addition to registering the identifier for with the user of the image processing apparatus and the identifier for the information processing apparatus; and
a transfer unit configured to transfer video received from the information processing apparatus to the corresponding image processing apparatus based on information registered by the registration unit.

10. The remote support system according to claim 9, wherein
the at least one processor and at least one memory of the relay server further act as
a notification unit configured to notify to the information processing apparatus a list that includes information in which the identifier for the user of the image processing apparatus is registered, out of information registered by the registration unit, in accordance with a request from the information processing apparatus.

11. A method of controlling a remote support system that includes an image processing apparatus, an information processing apparatus, and a relay server, and in which an operator that uses the information processing apparatus supports, via the relay server, a user that uses the image processing apparatus, wherein
in the image processing apparatus,
a first communication unit performs communication with the information processing apparatus via the relay server; and
a display control unit causes a display unit of the image processing apparatus to display video in accordance with data received from the information processing apparatus by the first communication unit, and
in the information processing apparatus,
a second communication unit performs communication with the image processing apparatus via the relay server;
a decision unit decides a mode for transmission to the image processing apparatus that is supported via the relay server; and
a transmission control unit transmits video via the relay server to the image processing apparatus by the second communication unit in accordance with a transmission setting corresponding to the decided mode for transmission,
wherein the transmission control unit
if the decided mode for transmission is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

12. An information processing apparatus that supports an image processing apparatus via a relay server comprising at least one processor and at least one memory coupled to the at least one processor which act as
a communication unit configured to perform communication with the image processing apparatus via the relay server;
a decision unit configured to decide a mode for transmission to the image processing apparatus that is supported via the relay server; and
a transmission control unit configured to transmit video via the relay server to the image processing apparatus by the communication unit in accordance with a transmission setting corresponding to the mode for transmission decided by the decision unit,
wherein the transmission control unit,
if the mode for transmission decided by the decision unit is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

13. An image processing apparatus that receives supports from an information processing apparatus via a relay server comprising at least one processor and at least one memory coupled to the at least one processor which act as
a communication unit configured to perform communication with the information processing apparatus via the relay server; and
a display control unit configured to perform control to display on a display unit of the image processing apparatus video in accordance with data received from the information processing apparatus by the communication unit and a transmission setting of a mode for transmission decided by the information processing apparatus included in the received data, wherein
the received data is video internal to a frame for deciding a region to be captured if the mode for transmission decided by the information processing apparatus is a first mode in which video that captures a portion of a screen displayed on a display unit of the information processing apparatus is transmitted.

14. A method of controlling an information processing apparatus that supports an image processing apparatus via a relay server, the method comprising:
a communication unit of the information processing apparatus performing communication with the image processing apparatus via the relay server;

a decision unit of the information processing apparatus deciding a mode for transmission to the image processing apparatus that is supported via the relay server; and a transmission control unit of the information processing apparatus transmitting video via the relay server to the image processing apparatus by the communication unit in accordance with a transmission setting corresponding to the decided mode for transmission, wherein the transmission control unit, if the decided mode for transmission is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

15. A method of controlling an image processing apparatus that receives support from an information processing apparatus via a relay server, the method comprising:

a communication unit of the image processing apparatus performing communication with the information processing apparatus via the relay server; and a display control unit of the image processing apparatus causing a display unit of the image processing apparatus to display video in accordance with data received from the information processing apparatus by the communication unit and a transmission setting of a mode for transmission decided by the information processing apparatus included in the received data, wherein the received data is video internal to a frame for deciding a region to be captured if the mode for transmission decided by the information processing apparatus is a first mode in which video that captures a portion of a screen displayed on a display unit of the information processing apparatus is transmitted.

16. A non-transitory computer-readable storage medium storing a computer program for causing a computer to execute a method of controlling an information processing apparatus that supports an image processing apparatus via a relay server, the method comprising:

a communication unit of the information processing apparatus performing communication with the image processing apparatus via the relay server;

a decision unit of the information processing apparatus deciding a mode for transmission to the image processing apparatus that is supported via the relay server; and a transmission control unit of the information processing apparatus transmitting video via the relay server to the image processing apparatus by the communication unit in accordance with a transmission setting corresponding to the decided mode for transmission, wherein the transmission control unit if the decided mode for transmission is a first mode in which video that captures a portion of a screen displayed on a display unit of the information processing apparatus is transmitted, displays on the display unit of the information processing apparatus a frame for deciding a region to be captured, and transmits to the image processing apparatus via the relay server video internal to the frame.

17. A non-transitory computer-readable storage medium storing a computer program for causing a computer to execute a method of controlling an image processing apparatus that receives support from an information processing apparatus via a relay server, the method comprising:

a communication unit of the image processing apparatus performing communication with the information processing apparatus via the relay server; and a display control unit of the image processing apparatus causing a display unit of the image processing apparatus to display video in accordance with data received from the information processing apparatus by the communication unit and a transmission setting of a mode for transmission decided by the information processing apparatus included in the received data, wherein the received data is video internal to a frame for deciding a region to be captured if the mode for transmission decided by the information processing apparatus is a first mode in which video that captures a portion of a screen displayed on a display unit of the information processing apparatus is transmitted.

* * * * *